(12) United States Patent
Krols et al.

(10) Patent No.: US 9,981,517 B2
(45) Date of Patent: May 29, 2018

(54) RAILWAY TRACTION VEHICLE

(71) Applicant: RENTALOC, BESLOTEN VENNOOTSCHAP MET BEPERKTE AANSPRAKELIJKHEID, Schilde (BE)

(72) Inventors: Dirk Krols, Bonheiden (BE); Bart Raymaekers, Schilde (BE)

(73) Assignee: RENTALOC BVBA, Lier (BE)

( * ) Notice: Subject to any disclaimer, the term of this patent is extended or adjusted under 35 U.S.C. 154(b) by 485 days.

(21) Appl. No.: 14/425,340

(22) PCT Filed: Aug. 28, 2013

(86) PCT No.: PCT/BE2013/000044
§ 371 (c)(1),
(2) Date: Mar. 3, 2015

(87) PCT Pub. No.: WO2014/032126
PCT Pub. Date: Mar. 6, 2014

(65) Prior Publication Data
US 2015/0224839 A1  Aug. 13, 2015

(30) Foreign Application Priority Data
Sep. 3, 2012  (BE) .................................. 2012/0572

(51) Int. Cl.
*B60F 1/04* (2006.01)
*B61D 15/00* (2006.01)
*B61J 3/12* (2006.01)

(52) U.S. Cl.
CPC .............. *B60F 1/043* (2013.01); *B61D 15/00* (2013.01); *B61J 3/12* (2013.01); *B60F 2301/04* (2013.01); *Y02T 30/30* (2013.01)

(58) Field of Classification Search
CPC ...................................................... B60F 1/043
(Continued)

(56) References Cited

U.S. PATENT DOCUMENTS 1,938,049 A * 12/1933 Serrano ................... B60F 1/043
 104/242
2,039,489 A * 5/1936 Messick .................. B60F 1/046
 105/215.2

(Continued)

FOREIGN PATENT DOCUMENTS

DE  102005002407 A1  2/2006

OTHER PUBLICATIONS

International Search Report, dated Jan. 8, 2014, from corresponding PCT application.

*Primary Examiner* — Zachary L Kuhfuss
(74) *Attorney, Agent, or Firm* — Young & Thompson

(57) ABSTRACT

Railway traction vehicle (1) that is equipped with four rubber wheels (6) and with four steel rail wheels (7), and all eight (8×8) can exert traction simultaneously on the rails over which a train is hauled. Each of the eight wheels is equipped with an individual hydraulic or electric motor (5) that can be controlled individually. The traction vehicle is equipped with tilting bogies (8a, 8b) with which the steel rail wheels can be raised or lowered. The tilting bogies also enable ballast bodies (24a, 24b) to be detached and placed on supports, by lowering the level of the supporting frame (2).

22 Claims, 8 Drawing Sheets

(58) Field of Classification Search
USPC .......................................................... 105/72.2
See application file for complete search history.

(56) References Cited

U.S. PATENT DOCUMENTS

| | | | | |
|---|---|---|---|---|
| 2,088,522 | A * | 7/1937 | Klima | B60F 1/04 |
| | | | | 105/72.2 |
| 3,044,820 | A * | 7/1962 | Cox | B60B 17/00 |
| | | | | 295/31.1 |
| 4,355,584 | A | 10/1982 | White, Jr. | |
| 4,537,137 | A * | 8/1985 | White, Jr. | B60F 1/043 |
| | | | | 105/215.2 |
| 5,868,078 | A * | 2/1999 | Madison | B60F 1/043 |
| | | | | 105/72.2 |
| 6,021,719 | A | 2/2000 | Kershaw, Jr. | |
| 8,166,883 | B1 * | 5/2012 | Coots | E01B 29/32 |
| | | | | 104/16 |
| 2003/0172837 | A1 * | 9/2003 | Whiston | B60F 1/043 |
| | | | | 105/215.2 |
| 2005/0204949 | A1 | 9/2005 | Jacob | |

* cited by examiner

RAILWAY TRACTION VEHICLE

The present intention relates to a railway traction vehicle with a specific drive and traction system.

More specifically, the invention is intended for a railway traction vehicle for mixed use, which means a traction vehicle that can move on railway tracks and on a hardened road surface.

Railway traction vehicles for mixed use have been known for a long time. For example, converted lorries (for example Unimog) are known that are driven on their four rubber wheels, and which are equipped with a hydraulically lowerable rail guidance system with metal rail wheels that keep the lorry on the railway track while pulling a train of wagons.

The traction of such a converted lorry is solely provided by the rubber wheels in contact with the steel rails, whereby a 4×4 drive is frequently used, i.e. the exertion of traction by the four rubber wheels on the rails themselves.

An advantage of such a converted lorry is that after hauling the desired wagons, the vehicle can easily be moved to another place on a different track, by hydraulically raising the rail guidance system and driving off the track on the rubber wheels to another track where the lorry can position itself in front of another rail vehicle to be moved, without having to ride over points or other tracks, such as is necessary for a traditional shunting locomotive on steel rail wheels.

However, a disadvantage is that the traction that a lorry can deliver is limited, and thus also the weight of the wagons that must be moved.

Other railway traction vehicles have been developed whereby the traction can be delivered by four rubber wheels that make contact with the rails, and exert the traction force on them. These machines with rubber wheels specifically adapted for rail use also have metal rail guidance wheels that can be lowered while pulling train wagons, and raised if the traction vehicle has to be moved to another track on its rubber wheels, but these metal rail wheels do not exert any traction force on the rails.

It is known that rubber on steel has a greater grip than steel on steel. The traction power is around four times higher, so that the converted machine has the force of a small conventional locomotive with steel rail wheels. As a rule of thumb the haulable load is approximately one hundred times higher than the weight of the traction vehicle itself, so that a converted machine of 16 tonnes can haul a weight of 1,600 tonnes, i.e. a train of approx. 20 full wagons.

A disadvantage of these converted machines is that although they can haul more weight than a converted lorry, their speed on the track during hauling is limited if heavier trains are hauled.

A disadvantage of such converted railway traction vehicles is that the transmission of traction to the rails is limited to the four rubber wheels that were already built into the machines from which they are derived.

Another disadvantage of such converted railway traction vehicles is that its own weight is limited by the load capacity of the four rubber wheels, and thus the hauling capacity is also limited. Such a traction vehicle can weigh up to 8 tonnes per axle and can haul a train of a maximum of 1600 tonnes if there are two axles, or 2400 tonnes if there are three axles with rubber wheels, and this with acceptable tyre wear. Railway traction vehicles with a higher weight present an unacceptably high wear and puncture frequency.

The purpose of the present invention is to provide a solution to the aforementioned and other disadvantages by providing a railway traction vehicle that is equipped with four rubber wheels and four steel rail wheels, treaded or otherwise, and all eight (8×8) exert traction on the rails over which a train is hauled.

An advantage is that the weight of the 8×8 railway traction vehicle can be up to 30 tonnes and more, and consequently can haul a train with a weight of 3000 tonnes.

Another advantage is that the rubber wheels are loaded less during hauling, as the steel rail wheels, which may or may not be treaded, contribute to a large and adjustable extent to bearing the weight of the traction vehicle and to delivering traction force to the rails.

Preferably the rubber wheels can be turned over an angle of 270°, so that these wheels can be turned over an angle of 90°, for example, to drive the 8×8 vehicle sideways off the track on which the traction vehicle is standing, in order to go to a different position.

Preferably the four steel rail wheels are covered with a traction-increasing covering such as a plastic or rubber or a composition that has a good grip on metal.

An advantage of such a covering is that it prevents steel rail wheels slipping due to a lack of grip on the rails.

In a first embodiment each of the eight wheels is driven by an individual hydraulic motor that is supplied by a central hydraulic pump driven by a central combustion engine or central electric motor or a hybrid engine.

An advantage of such a hydraulic drive is that the traction for each of the wheels can be controlled separately by separately adjusting the hydraulic motor of each wheel by adjusting the swept volume of the plungers in the hydraulic plunger motor of each wheel.

In an alternative embodiment, each of the eight wheels are driven by an individual electric motor that is supplied by an electrical energy source present on the traction vehicle.

An advantage of such an electric drive is that the traction for each of the eight wheels can be controlled separately, and can be electronically controlled by adjusting the electrical energy supply to each wheel.

Another advantage of such an electric drive is that the railway traction vehicle is suitable for use in covered enclosed spaces, such as factory buildings, because no combustion gases are released and because the electric motors are low noise.

Preferably the steel rail wheels, treaded or otherwise, can be pneumatically or electrically raised, such that they no longer make contact with the rails, and enable the traction vehicle to travel to another track on its rubber wheels by road.

With the intention of better showing the characteristics of the invention, preferred embodiments of a railway traction vehicle according to the invention are described hereinafter by way of examples, without any limiting nature, with reference to the accompanying drawings, wherein:

FIG. 1 schematically shows a perspective view of a railway traction vehicle according to the invention;

Figure 1:
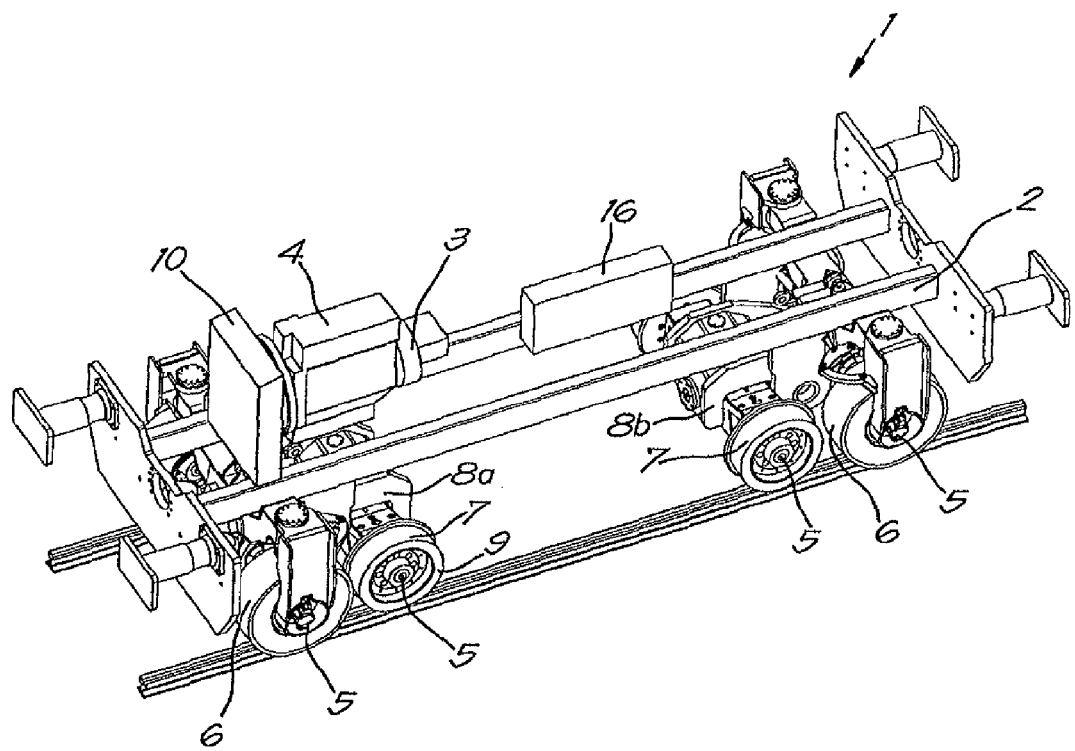
Figure 2:
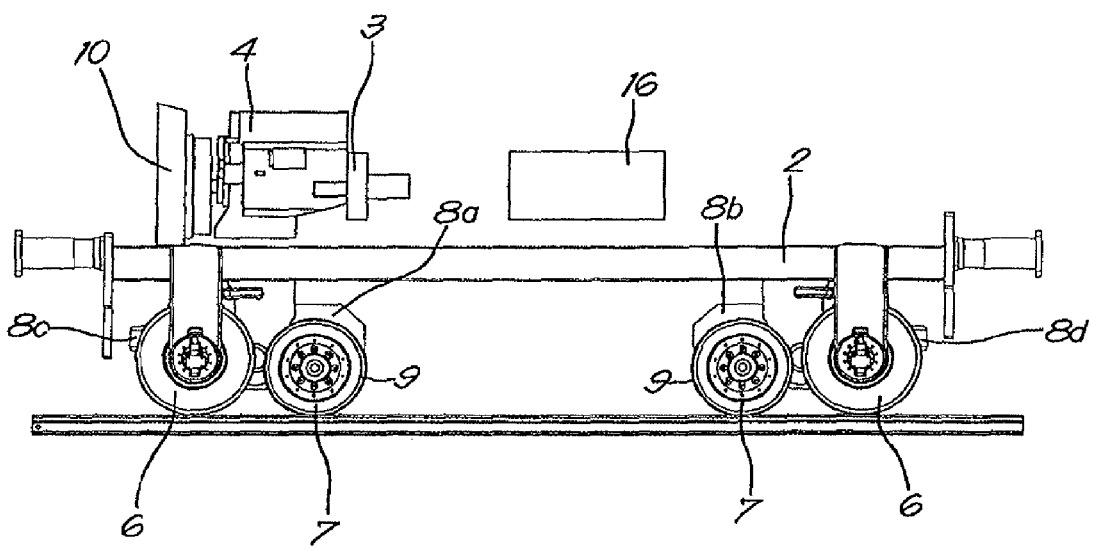
FIG. 2 shows a side view of FIG. 1.
Figure 4:
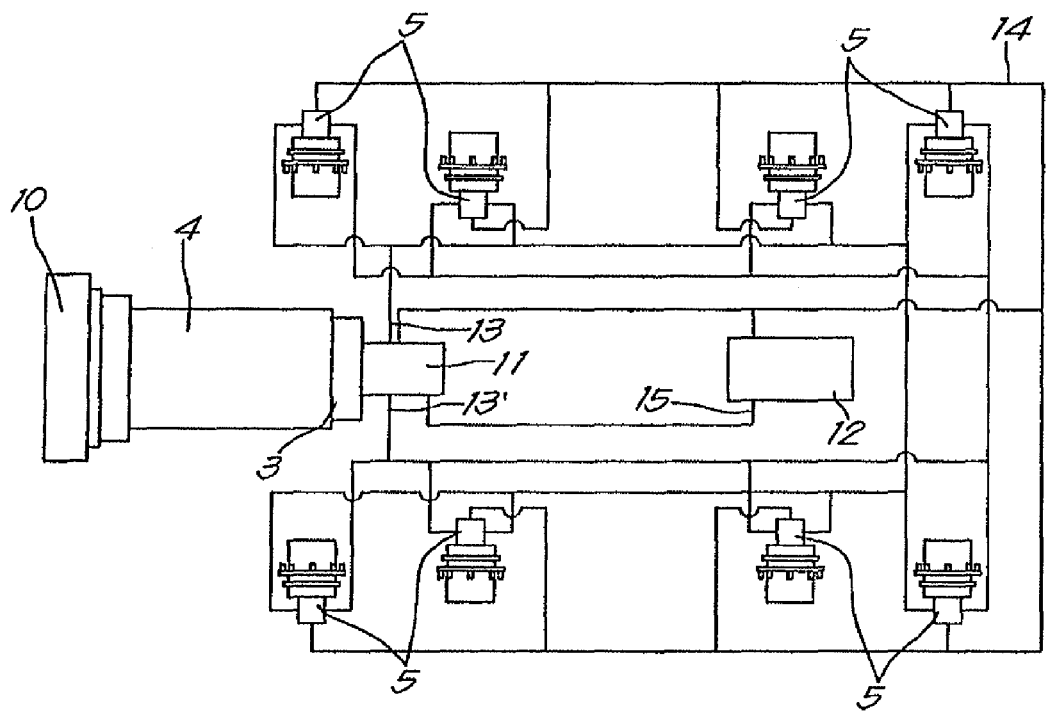
FIG. 4 shows a hydraulic circuit diagram of the railway traction vehicle according to the invention in a hydraulically driven embodiment.
Figure 7:
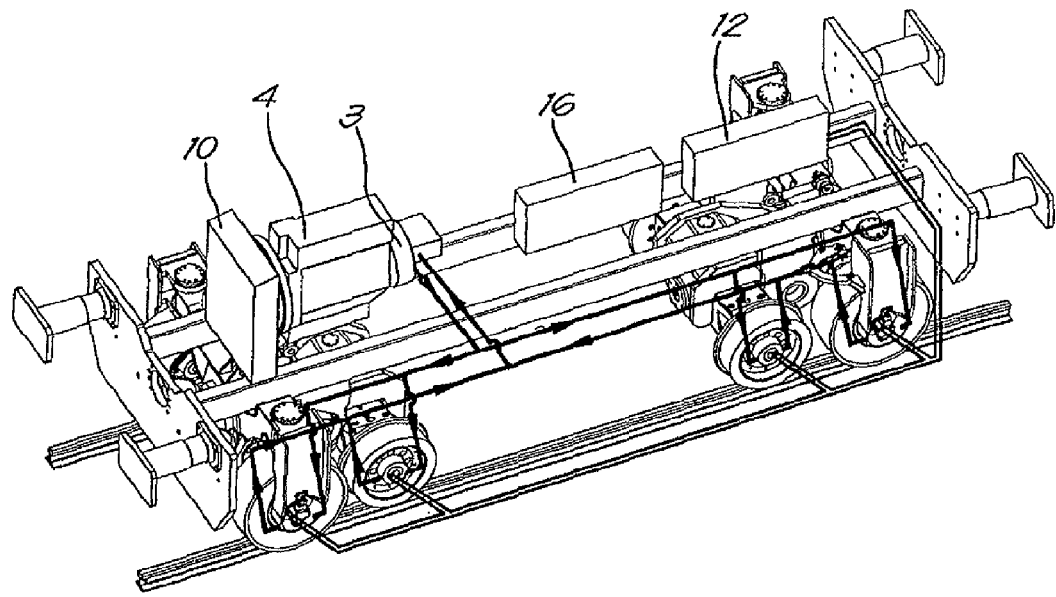
Figure 8:
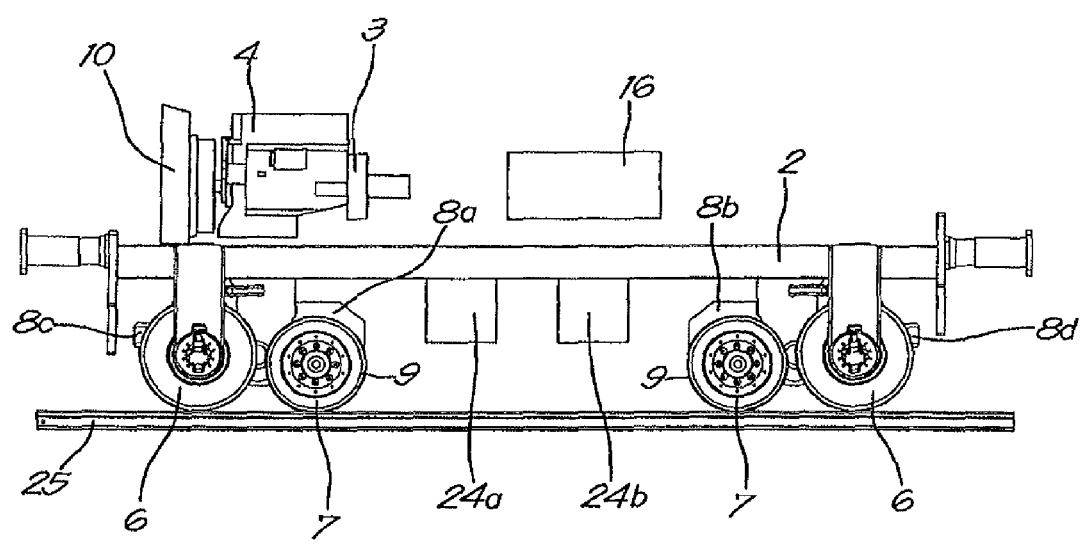
Figure 9:
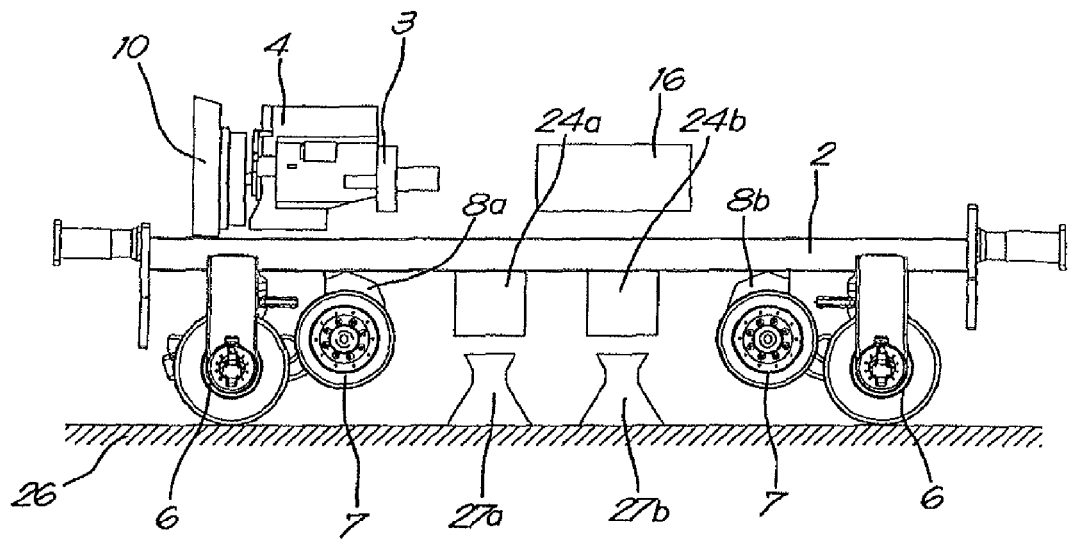
Figure 10:
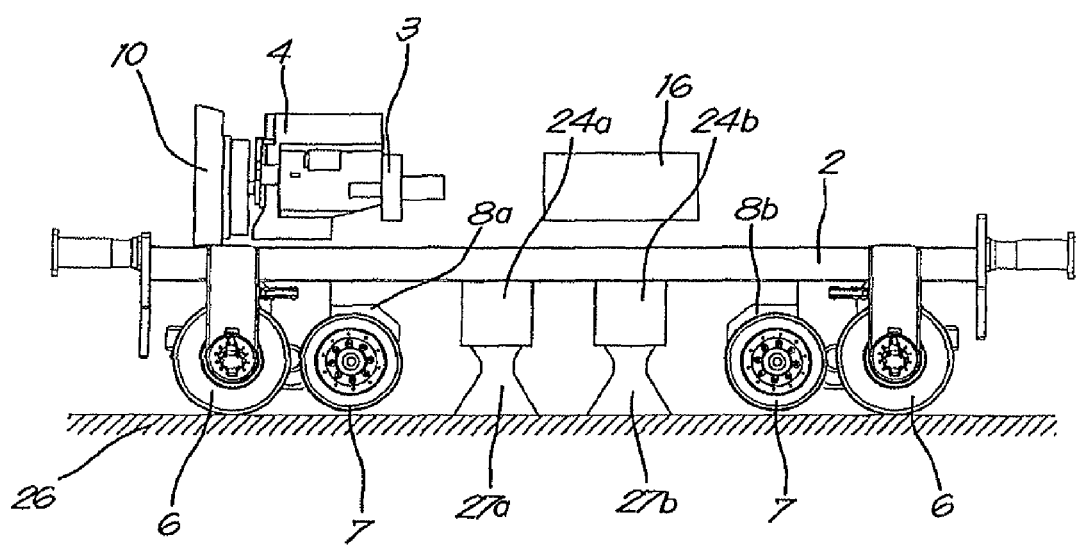
Figure 11:
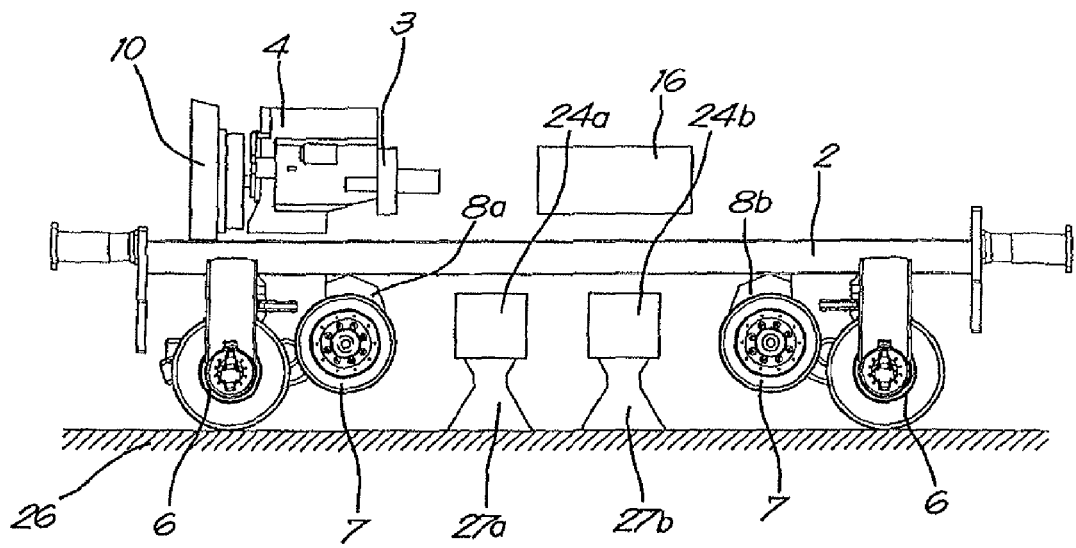
Figure 12:
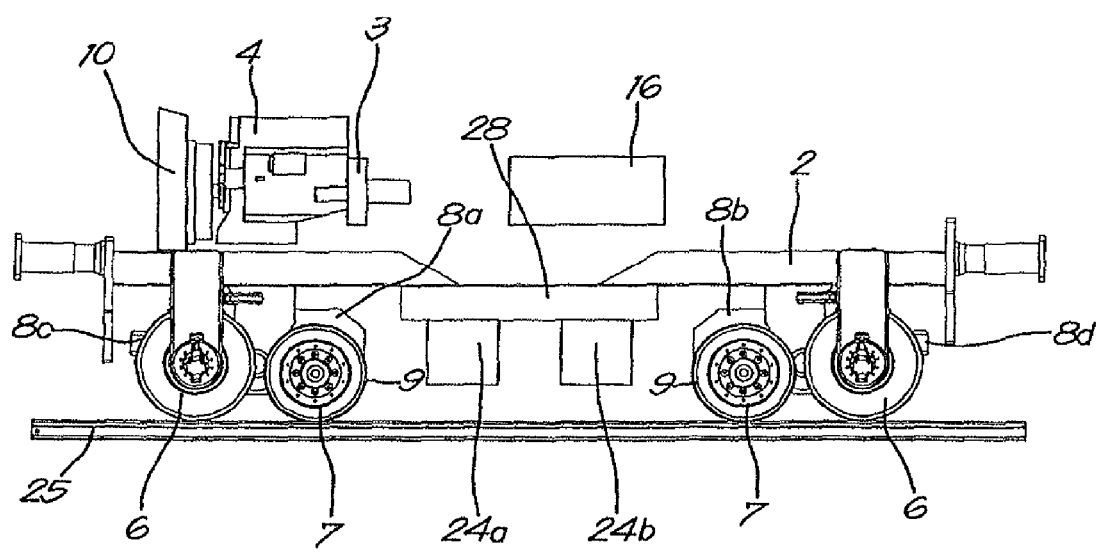
Figure 13:
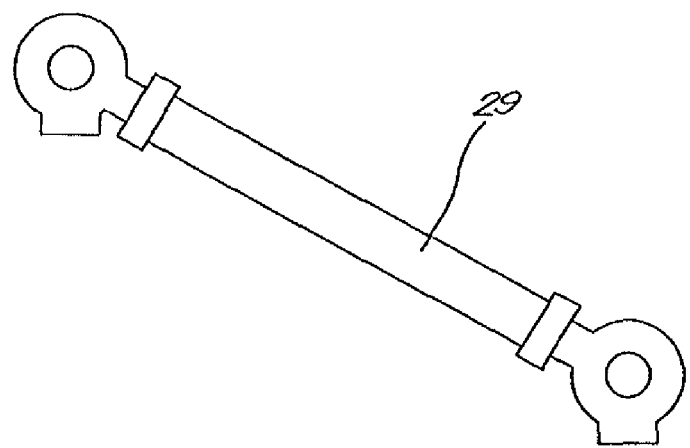
Figure 14:
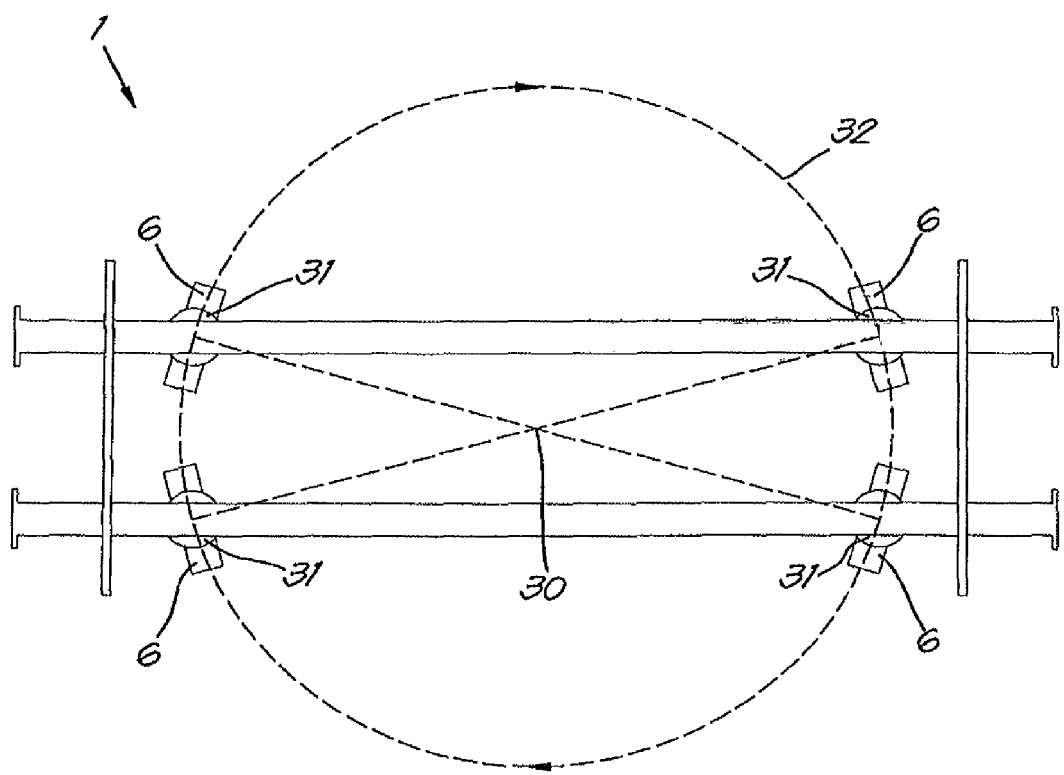
Figure 15:
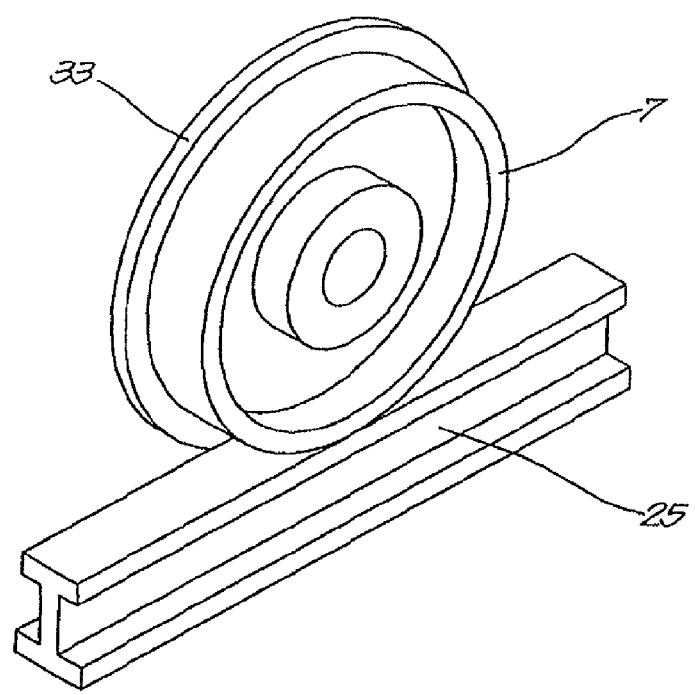

FIG. 7 schematically shows a perspective view of the hydraulic system of FIG. 4 of the railway traction vehicle;

FIG. 8 shows FIG. 2 but now equipped with two ballast bodies;

FIG. 9 shows FIG. 8 with raised bogies and with supports under the ballast bodies;

FIG. 10 shows FIG. 9 with lowered bogies and ballast bodies that rest on the supports;

FIG. 11 shows FIG. 10 with raised bogies and uncoupled ballast bodies that rest on the supports;

FIG. 12 shows a variant of FIG. 1 with a segmented frame;

FIG. 13 shows a compensating rod for stabilising a raised bogie;

FIG. 14 shows a top view of FIG. 1 with a rubber wheel position that enables rotation of the entire railway traction vehicle 1 over 360°;

FIG. 15 shows a variant of a rail wheel, provided with a separate side flange.

FIG. 1 schematically shows a first embodiment of a railway traction vehicle 1 according to the invention, consisting of a supporting framework 2, on which a central hydraulic system 3 is mounted that is driven by a combustion engine 4 or an electric power source, and which is hydraulically coupled to each of the eight hydraulic motors 5 that are affixed to the hub of each of the eight wheels.

The eight driven wheels consist of four driven rubber wheels 6 and four driven steel rail wheels 7 whereby the axles of the wheels are fastened to two bogies 8a and 8b, that each have an axle with two rubber wheels 6 and an axle with two steel rail wheels 7, and each are fastened in a hinged way to the supporting frame 2, and each of which can be tilted by means of pneumatic air springs 8c, 8d. The running surface of the steel rail wheels 7 is provided with a traction-increasing covering 9 that improves the grip of the steel rail wheels 7 on the rails. Ordinary steel rail wheels without a covering can also be used.

FIG. 2 shows a side view of FIG. 1, where in this case the unequal diameters of the rubber wheels 6 and the treaded steel rail wheels 7 can clearly be seen. The rubber wheels 6 and the steel rail wheels 7 can also have the same diameters, without jeopardising the good operation of the railway traction vehicle according to the invention.

Figure 3:
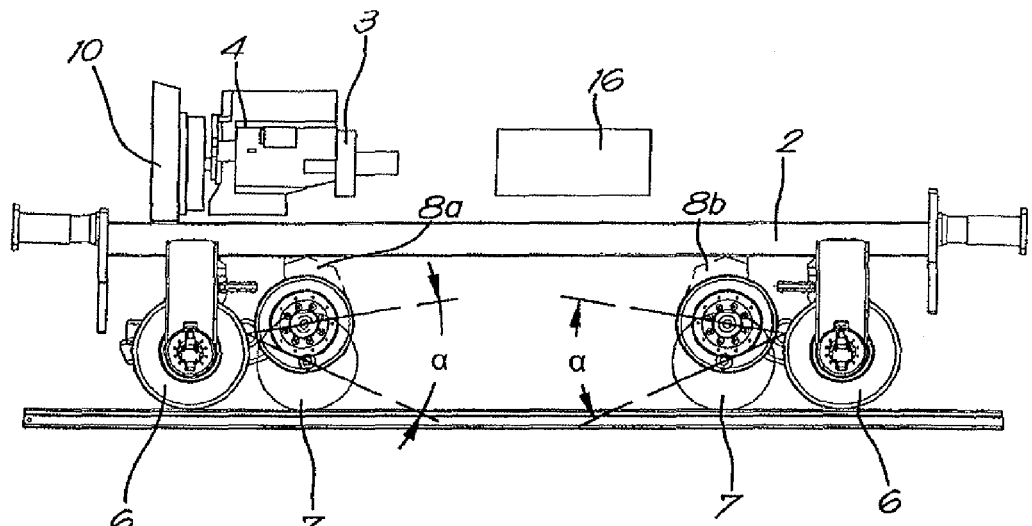
FIG. 3 shows FIG. 2 with raised steel rail wheels.

FIG. 3 shows the same side view of FIG. 2, but now with tilted bogies 8a,8b such that the steel rail wheels 7 no longer make contact with the underlying rails. The air springs 8c, 8d are now filled with compressed air and cause the tilting of the two bogies 8a and 8b, due to the downward pressure on the rubber wheels 6, such that the framework 2 is lifted to a higher level with respect to the rails.

FIG. 4 shows the hydraulic circuit diagram of the 8×8 drive of the railway traction vehicle 1, consisting of an electric motor or combustion engine 4 with cooling 10, coupled to a variable pump 11, which forms a closed drive system with oil that is pumped from a collection tank 12 in a high pressure circuit 13. The high pressure circuit 13 supplies the hydraulic motors in the four rubber wheels 6 and in the four steel rail wheels 7 of the traction vehicle 1. After passing through the hydraulic motors, the used oil flows in the high pressure circuit 13' back to the variable pump 11, after which the oil is used again in the circuit 13. A second circuit 14 for oil that acts as a leak and rinse pipe under low pressure runs from each hydraulic motor 5 to the collection tank 12, from where oil is drawn by an extraction pipe 15 for the oil supply for the variable pump 11 and the hydraulic motors.

Figure 5:
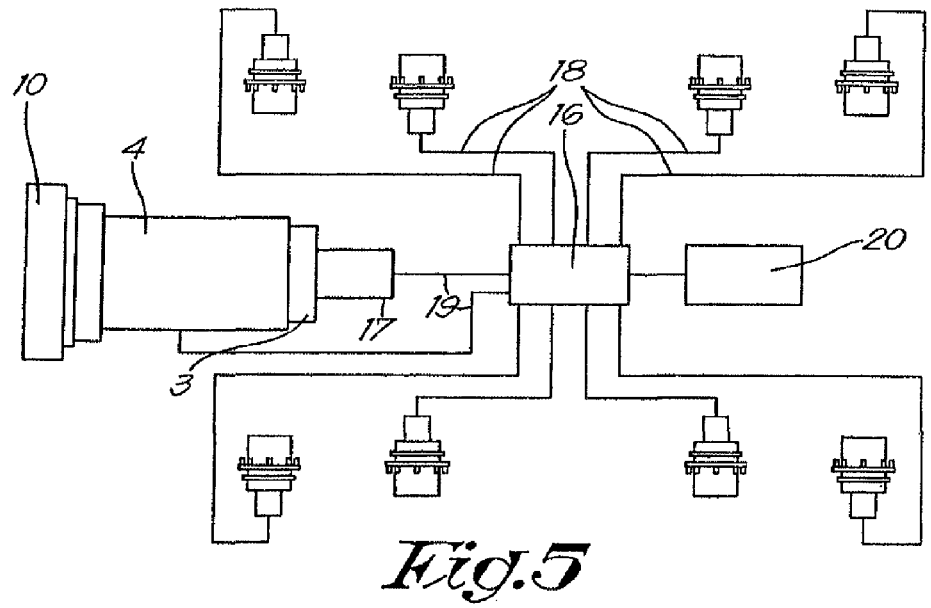
FIG. 5 shows the electric circuit diagram of the hydraulically driven embodiment of FIG. 4.

FIG. 5 shows the electric circuit diagram of the 8×8 drive of a hydraulically driven embodiment of the railway traction vehicle 1 according to the invention, consisting of a central electronic control unit 16 (PLC) that is electrically connected to a variable drive pump 17 driven by a combustion engine 4 and is also electrically connected to the hydraulic supply pipes 18 to each variable motor 5 on each wheel for sending and receiving control signals. The central electronic control unit is also electrically connected to the hydraulic pipe 19 from and to the variable drive pump 17, and to a battery cell 20 for the power supply of the electric circuit.

Figure 6:
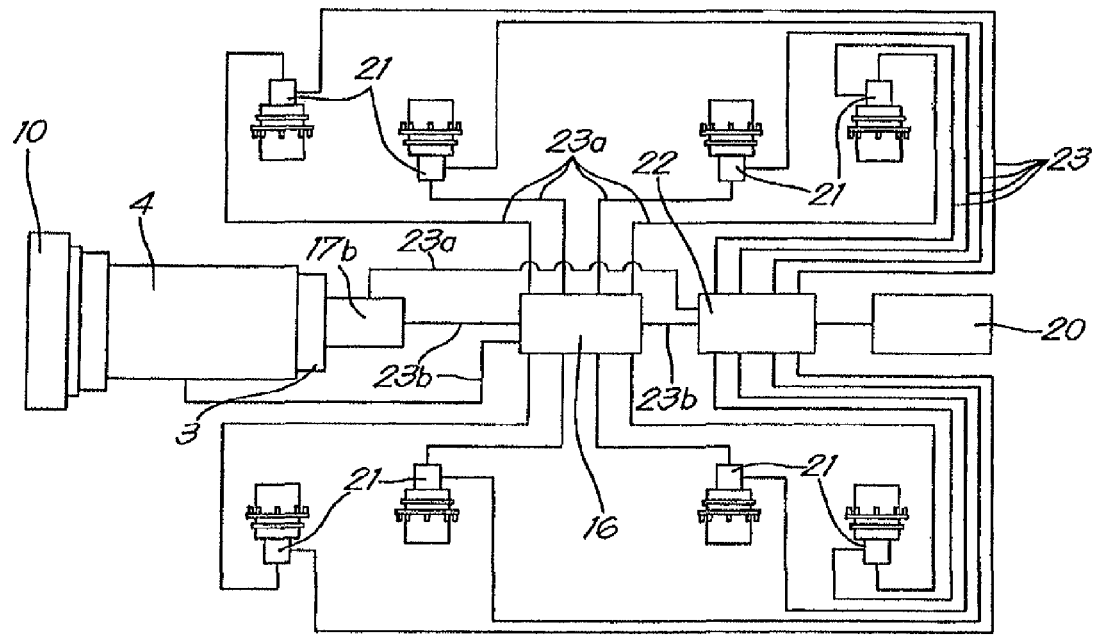
FIG. 6 shows an electric circuit diagram of the railway traction vehicle according to the invention in an electrically driven embodiment.

FIG. 6 shows the electric circuit diagram of the 8×8 drive for an electrically driven embodiment of the railway traction vehicle 1 according to the invention, consisting of a central combustion engine 4 with cooling 10, connected to a central battery 20, that provides electrical energy to each of the eight electric motors 21 via a switch box 22 whereby each electric motor drives one of the eight wheels. A switch box 22 is electrically connected to a central electronic control unit (PLC) 16 that ensures the separate control as a function of time of the electric power that is supplied separately to each wheel by electricity supply cables 23a, and to this end sends the necessary control signals via electrical connections 23b to these electricity supply cables 23a.

FIG. 7 schematically shows a perspective view of the hydraulic circuits 13,13' and 14 of the hydraulic embodiment of the traction vehicle. The flow direction of the oil in the high-pressure pipe 13 and 13' is indicated by arrows on the pipes. The central control unit 16 controls the swept volume of the plungers in the hydraulic plunger motor 5 of each wheel separately, via an electrical connection (not shown).

FIG. 8 shows a side view of the railway traction vehicle according to the invention, but now equipped with two ballast bodies 24a, 24b that are fastened to the supporting frame 2 in a suspended way with a detachable latch, and standing on the rails 25 with its eight wheels 6, 7.

FIG. 9 shows the railway traction vehicle of FIG. 8, equipped with two ballast bodies 24a, 24b, whereby both bogies 8a, 8b have now been raised, so that the steel rail wheels 7 no longer make contact with the ground, and with its four rubber wheels standing on firm ground 26 or paving. The supporting framework 2 of the traction vehicle with its ballast bodies 24a, 24b is higher with respect to the firm ground 26, so that supports 27a, 27b can be slid under the ballast bodies.

FIG. 10 shows the railway traction vehicle of FIG. 9, whereby both bogies 8a, 8b have now been lowered, so that the steel rail wheels do not yet make contact with the firm ground 26, but the ballast bodies 24a, 24b now make contact with the supports 27a, 27b and can be detached from the supporting frame 2.

FIG. 11 shows the railway traction vehicle of FIG. 10 whereby the bogies 8a, 8b have been raised again, so that the supporting framework 2 is now above the detached ballast bodies 24a, 24b and they stay standing on their supports 27a, 27b on firm ground 26.

FIG. 12 shows a variant of the railway traction vehicle with a segmented framework, whereby the segment 28 of frame 2 between the bogies 8a, 8b with wheels is lowered, so that sufficient space is available in the operating cabin to be able to stand upright in the cabin.

FIG. 13 shows a compensating rod 29 that is in the longitudinal direction of the railway traction vehicle, and which ensures that the steering mechanism section (stub axles) of the bogie 8a and 8b always stay in a vertical position and cannot tilt with respect to the traction vehicle after raising the bogie.

FIG. 14 shows a top view of the railway traction vehicle according to the invention, whereby the four rubber wheels 6 are each in a position perpendicular to the diagonals through the centre of the traction vehicle 30 and the centre 31 of the four rubber wheels 6. In this position the four rubber wheels trace a circular path 32 such that the entire unit 1 can be turned around its own centre 30 over 360°.

FIG. 15 shows a steel rail wheel 7 of the railway traction vehicle, but now equipped with a separate side flange 33 to guide the steel rail wheels to their correct position on the rails when lowering the bogies 8a, 8b.

The operation of the railway traction vehicle 1 can be explained as follows.

The traction vehicle 1 is stored with tilted bogies 8a,8b and thus with raised steel rail wheels 7 and standing on the four rubber wheels 6, whereby the steering mechanism section (stub axles) of the bogie 8a and 8b always stays in a vertical position and cannot tilt with respect to the traction vehicle after raising the bogie. The traction vehicle is driven on its rubber wheels 6, which can be turned, to the location on the track where the traction vehicle is required to move a train of one or more wagons, and this by means of the hydraulic drive that is available on the four rubber wheels 6, and which are each connected to the central hydraulic pump 11 by a high-pressure pipe 13 that provides the required hydraulic pressure. The railway traction vehicle can hereby turn around its centre by 360° to bring it to the desired position.

The unit is placed in front of the train wagon with its rubber wheels 6 on the rails so that the metal rail wheels 7 are lined up with the rails 25 that are underneath. The metal rail wheels 7 are now lowered by tilting both bogies 8a,8b by means of a pneumatic system that operates the air springs and releases the air pressure, until the metal rail wheels make contact with the rails and whereby the metal rail wheels 7 are guided to their correct position on the rails 25 by their separate side flanges 33.

The steel rail wheels are not actively pushed down on the rails by an additional downward pressure, but by the pressure exerted by the weight of the railway traction vehicle 1 itself, and thus forms a passive rail guidance system.

This passive rail guidance system is much more reliable than an active rail guidance as is known in the state of the art, whereby an active pressure control is exerted on the metal rail wheels for the rail guidance.

Indeed, when the active pressure is lost the traction vehicle can derail, which does not happen with the passive rail guidance system because its own weight always exerts a sufficiently high pressure due to gravity. Then the traction vehicle is coupled to the train of wagons that has to be hauled.

In its hydraulic embodiment the traction vehicle is now set in motion by increasing the power in the hydraulic motors 5 that are mounted on each of the eight wheels, until it causes traction on the rails 25 and the entire train is set in motion. Each wheel is controlled separately by an electromagnetic valve on the hydraulic plunger motor of the wheel whereby the swept volume of the plungers in the hydraulic plunger motor of each wheel is adjusted separately according to the desired tractive power via an electrical connection.

The traction and speed of the train can be controlled by a central control unit that makes use of a PLC equipped with CAN BUS communication. To brake the train a traditional pneumatic system with compressed air is used, with which each wagon of the train can be braked, while the traction vehicle itself is hydraulically braked.

In its electrical embodiment the traction vehicle is now set in motion by increasing the power in the electric motors 5 that are mounted on each of the eight wheels, until these eight wheels cause traction on the rails 25 and the entire train is set in motion. Each wheel is controlled separately by electronically controlling the electrical energy supply, which determines the tractive power of each wheel separately, according to the desired tractive power.

The electronic controller makes use of a PLC equipped with a CAN BUS communication. To brake the train a traditional pneumatic system with compressed air is used, with which each wagon of the train can be braked, while the traction vehicle itself is electrically braked.

After the train has been brought to the desired position, the traction vehicle 1 is uncoupled and the bogies 8a,8b are tilted so that the steel rail wheels 7 no longer make contact with the rails 25. The rubber wheels 6 can now be turned in the direction in which the traction vehicle 1 has to be driven off the rails, whereby the traction vehicle is only supported by its four rubber wheels, and whereby the steering mechanism section (stub axles) of the bogie 8a and 8b always stays in a vertical position and cannot tilt with respect to the traction vehicle after raising the bogie.

The traction vehicle 1 is now a vehicle that can travel over the road to another location, where the presence of the traction vehicle is required, and the entire usage cycle can be repeated.

The operation of the traction vehicle enables the operator to continually adjust and adapt the traction power to the situation of the moment during its use as a traction vehicle by controlling the traction power in each of the eight wheels separately. For example he can bring each of the rubber wheels to a position perpendicular to the connecting line of the wheel to the centre of the traction vehicle, whereby a rubber wheel position is obtained that enables rotation of the entire railway traction vehicle by 360°, and whereby the rubber wheels all trace the same circular path around the centre of the traction vehicle.

Preferably the railway traction vehicle is equipped with ballast bodies 24a, 24b that are fastened detachably in a suspended way to the supporting frame 2 of the railway traction vehicle.

These ballast bodies 24a, 24b are needed to increase the weight of the traction vehicle and consequently to provide a higher hauling power, but they form an undesired weight when the traction vehicle travels on the public road, or it has to be transported on the public roads to another location by means of a transportation vehicle.

Preferably due to the downward tilting of the bogies 8a, 8b with respect to the axle with rubber wheels 6, the level of the supporting frame can be lowered to the level at which the ballast bodies 24a, 24b rest on supports 27a, 27b on the ground and their latch, preferably a twist-lock system, fastened to the supporting frame of the railway traction vehicle, can be uncoupled without the ballast bodies 24a, 24b falling downwards.

This property of the traction vehicle, equipped with tiltable bogies 8a, 8b, enables the ballast bodies of the traction vehicle to be removed, without special tools or aids being required for this purpose, and to be stored in a desired place for future use.

This is possible due to the upward tilting of the bogies 8a, 8b with respect to the axle with rubber wheels 6, such that the level of the supporting frame 2 can be raised up to a level at which the railway traction vehicle is above the uncoupled and stored ballast bodies 24a, 24b, such that the traction vehicle can drive away and be transported without taking the ballast bodies along.

This property of the traction vehicle enables the weight of the traction vehicle, when it is not being used to haul heavy trains, to be strongly reduced by uncoupling the ballast bodies, which can weigh 4 tonnes per body, and this without special tools being required to store or lift the ballast bodies.

The advantage attached to this is that its transport is not only cheaper due to the lower weight, but also because its transport can be done without the transport restrictions imposed on a traction vehicle with ballast bodies, such as the maximum weight that can be transported on a motorway, limiting its transportation as an abnormal transport to certain times and locations, etc.

This also provides advantages for the maintenance of the traction vehicle, because the transportation of the traction vehicle by road is less problematic when the ballast bodies are missing.

It goes without saying that the control of the traction vehicle can be automated up to a certain extent. It also goes without saying that the hydraulic system can have more than one oil pump and more than one oil collection tank.

It also goes without saying that the railway traction vehicle must also be equipped with the statutory facilities imposed on the use on railways. For example some countries require the steel rail wheels not to be treaded in order to be able to be used on the public railway. On the other hand its use in certain environments requires the traction vehicle to be free of emissions of combustion gases, whereby an electrically driven embodiment is indicated.

The present invention is by no means limited to the embodiments described as an example and shown in the drawings, but a railway traction vehicle for mixed use with eight driven traction wheels according to the invention can be realised in all kinds of variants, without departing from the scope of the invention.

The invention claimed is:

1. Railway traction vehicle (1) with four rubber wheels (6) and with four steel rail wheels (7), and all eight (8×8) can exert traction simultaneously on the rails over which a train is hauled, whereby the traction vehicle is equipped with a passive rail guidance system consisting of the four steel rail wheels (7) that are pushed down onto the rails by the pressure exerted by the weight of the railway traction vehicle itself and that are raised by tilting two bogies while each of the two tilting bogies contains an axle with two rubber wheels (6) and an axle with two steel rail wheels (7), and each of the two axles is fastened in a hinged way to a supporting framework (2), around a rotation axis that is positioned below the framework and symmetrically between the two axles of the same bogey, wherein the two rubber wheels (6) on each bogie can be turned over an angle of 270° independently of each other and over an angle that is the same or different from each other.

2. The railway traction vehicle according to claim 1, wherein the four steel rail wheels (7) are covered with a traction-increasing covering (9).

3. The railway traction vehicle according to claim 2, wherein the traction-increasing covering (9) primarily consists of a plastic or rubber.

4. The railway traction vehicle according to claim 1, wherein each of the eight wheels (6, 7) is driven by an individual hydraulic motor (5).

5. The railway traction vehicle according to claim 4, wherein the hydraulic motor (5) of each of the eight wheels (6,7) is supplied by a central hydraulic pump (11) driven by a combustion engine (4).

6. The railway traction vehicle according to claim 5, the traction vehicle is equipped with a GPS control, that automatically stops the combustion engine (4) connected to the electricity generator (17b) when the traction vehicle goes into covered spaces.

7. The railway traction vehicle according to claim 5, wherein the traction for each of the eight wheels (6, 7) is separately controllable by adjusting the swept volume of the plungers in the hydraulic plunger motor of each wheel separately via an electronic connection.

8. The railway traction vehicle according to claim 4, wherein the traction for each of the eight wheels (6, 7) is separately controllable by adjusting the swept volume of the plungers in the hydraulic plunger motor of each wheel separately via an electronic connection.

9. The railway traction vehicle according to claim 1, wherein each of the eight wheels (6, 7) is driven by an individual electric motor (5).

10. Railway traction vehicle according to claim 9, wherein the electric motor (5) of each of the eight wheels (6,7) is supplied by a central combustion engine (4) with an electrical generator (17b), connected to a central battery (20).

11. The railway traction vehicle according to claim 10, wherein the traction for each of the eight wheels (6, 7) is separately controllable by electronically controlling the electrical energy supply that determines the traction power of each wheel separately.

12. The railway traction vehicle according to claim 9, wherein the traction for each of the eight wheels (6, 7) is separately controllable by electronically controlling the electrical energy supply that determines the traction power of each wheel separately.

13. The railway traction vehicle according to claim 1, wherein the steel rail wheels (7) can be electrically or pneumatically raised, such that they no longer make contact with the rails, and enable the traction vehicle (1) to travel on its rubber wheels (6) by road to another track.

14. The railway traction vehicle according to claim 1, wherein the bogies (8a,8b) can be tilted by pneumatically operating air springs.

15. The railway traction vehicle according to claim 1, wherein the traction vehicle is equipped with ballast bodies that are detachably fastened in a suspended way to the supporting frame of the railway traction vehicle.

16. The railway traction vehicle according to claim 15, wherein as a result of the downward tilting of the bogies with respect to the axle with rubber wheels, the level of the supporting frame can be lowered to the level at which the ballast bodies rest on support points on the ground and their attachment to the supporting frame can be released without the ballast bodies falling downwards.

17. The railway traction vehicle according to claim 15, wherein as a result of the upward tilting of the bogies with respect to the axle with rubber wheels, the level of the supporting frame can be raised up to a level at which the railway traction vehicle is above the stored ballast bodies, such that the traction vehicle can drive away or be transported without taking the ballast bodies along.

18. The railway traction vehicle according to claim 15, wherein the ballast bodies are fastened to the supporting frame of the railway traction vehicle by means of a twist-lock system.

19. The railway traction vehicle according to claim 1, wherein the framework is segmented.

20. The railway traction vehicle according to claim 1, wherein each of the two bogies is equipped with a compensating rod to stabilize a raised bogie.

21. The railway traction vehicle according to claim 1, wherein the traction vehicle can bring the four rubber wheels (6) each in a position perpendicular to diagonals through a centre of the traction vehicle (30) and a centre (31) of the four rubber wheels (6) whereby the four rubber wheels trace a circular path (32) such that the entire traction vehicle (1) can be turned around the centre (30) of the traction vehicle over 360°.

22. The railway traction vehicle according to claim 1, the traction vehicle has one or more steel rail wheels that have a separate side flange.

\* \* \* \* \*